-75 XR 3,900,704
250/203

United States Patent [19]

Thomas, Jr. et al.

[11] 3,900,704

[45] Aug. 19, 1975

[54] ARBS TV TRACKER

[75] Inventors: Virgil E. Thomas, Jr.; Donald G. Quist, both of China Lake, Calif.

[73] Assignee: The United States of America as represented by the Secretary of the Navy, Washington, D.C.

[22] Filed: July 31, 1972

[21] Appl. No.: 278,492

[52] U.S. Cl...... 178/6.8; 178/DIG. 21; 250/203 CT

[51] Int. Cl.²........................................... H04N 3/16

[58] Field of Search...................... 178/DIG. 21, 6.8; 250/203 CT; 315/23

[56] References Cited

UNITED STATES PATENTS

| | | | |
|---|---|---|---|
| 3,039,002 | 6/1962 | Guerth | 178/DIG. 21 |
| 3,507,991 | 4/1970 | Scotchie et al. | 178/DIG. 21 |
| 3,541,246 | 11/1970 | Goldfischer | 178/DIG. 21 |
| 3,603,686 | 9/1971 | Paine | 178/DIG. 21 |
| 3,714,373 | 1/1973 | Kuhn | 178/DIG. 21 |
| 3,720,860 | 3/1973 | Wadlow | 315/23 |

*Primary Examiner*—Maynard R. Wilbur
*Assistant Examiner*—H. A. Birmiel
*Attorney, Agent, or Firm*—R. S. Sciascia; Roy Miller; Robert W. Adams

[57] ABSTRACT

A television tracker system having a camera which alternately scans both horizontally and vertically. Included is a processor having separate horizontal and vertical mode differentiators, in common, first pulse storage (target's first edge detector) and last pulse storage (target's last edge detector). The common components of the processor are shared, but used alternately, by the horizontal and vertical mode circuits. The above-mentioned first pulse and last pulse locate the target within the tracker window and provide the horizontal and vertical error signal information for centering said target.

2 Claims, 9 Drawing Figures

ARBS TV TRACKER

BACKGROUND OF THE INVENTION

The present invention relates to the field of television, or optical, tracking systems. Previous such systems, most of which were nondigital, include cameras which scan in only one direction, i.e., the television scan is restricted to, such as, the horizontal direction. As such, if a target is detected its left and right edge are precisely indicated; but its upper and lower edges can fall within the space between scan lines, resulting in imprecise definition. The method generally used to locate the target's vertical position within the raster is generally to count the number of scan lines after scan is initiated that the target is detected. The targets horizontal position is of course, determined for each scan line by measuring the time after the scan line is initiated that the target is detected.

Therefore, in previous systems the target edges residing at right angles to the scan direction are found indirectly and imprecisely. Such systems are subject to "jitter," which causes the upper and lower edges of the target to randomly appear at first one and then the other of adjacent scan lines. That is, if the upper edge of the target resides between two scan lines it will be randomly indicated by one and then the other of the adjacent scan lines. As a result, the systems tracking error signal will randomly indicate that tracking error is present first in one direction and then the other, causing the television camera to move accordingly, which compounds the problem.

In many applications "jitter-free" operation is required. As a result, precise upper and lower edge definition is necessary. The present invention provides such a system.

DESCRIPTION OF THE PREFERRED EMBODIMENT

The present invention is a digital, television, target tracking system that alternately scans both horizontally and vertically, i.e., the system includes first and second scans and the second scan is at right angles to the first scan, which will be referred to herein as the horizontal and vertical scans, respectively. Thereby, the system is "jitter-free", and the horizontal target tracking error is determined from the horizontal scan and the vertical target tracking error is determined from the vertical scan.

Figure 1:
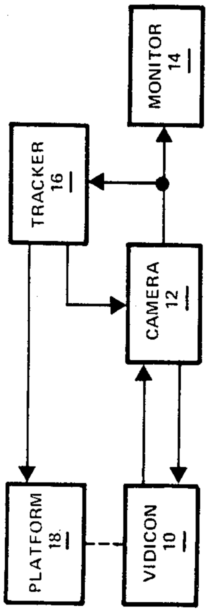
FIG. 1 is a block diagram of the television tracker's system.

FIG. 1 is a block diagram of a television, target tracking system showing the present invention. Vidicon 10 is the television camera tube which sees the target, and provides an output to camera circuit 12 in response to the scene viewed. Camera circuit 12 provides blanking and deflection plate control signals to vidicon 10 and, also, provides the video output which is coupled to tracker 16 and monitor 14 for visual presentation. Tracker 16 processes the video output and generates the vertical and horizontal error signals. The error signals are coupled to platform 18 which controls the position of vidicon 10, which control is shown by a mechanical link. Thereby, the error signals cause platform 18 to appropriately adjust the position of vidicon 10 to track the target.

Figure 2:
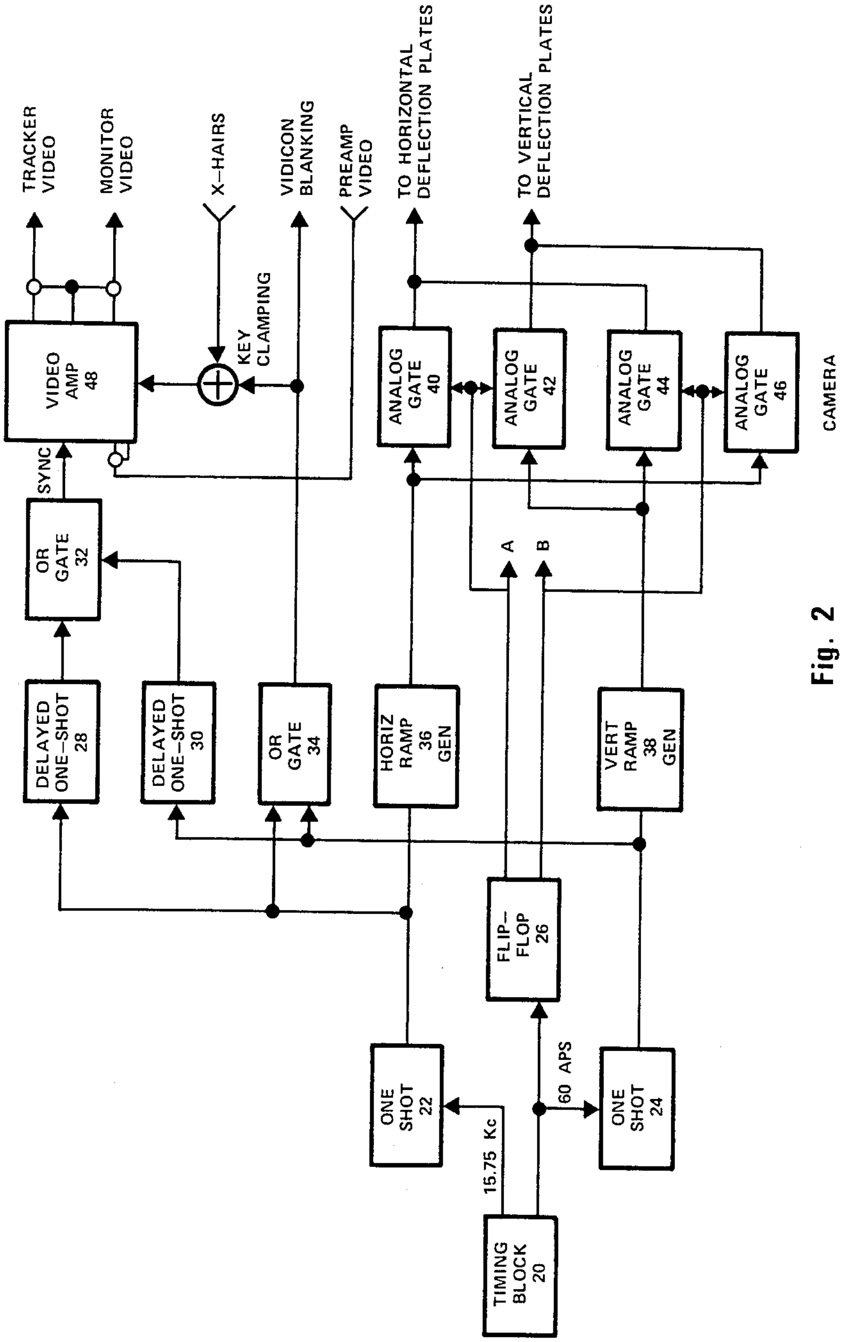
FIG. 2 is a block diagram of the television camera of the tracking system.

FIG. 2 shows the preferred embodiment of the camera of the present invention. It includes a video amplifier 48 which is coupled to the preamplified video output of the vidicon. Also inputted to the camera 12 are the vertical and horizontal cross-hair signals generated by tracker 16. Video amplifier 48 provides video outputs coupled to monitor 14 and tracker 16.

The preferred embodiment of the camera also includes circuitry for providing video amplifier 48 with synchronizing information, and for providing blanking and deflection plate control signals to the vidicon. The circuitry includes timing block 20 which provides two output signals, the first of 15.75 kilohertz and the second of 60 hertz. The first is coupled to one-shot 22 which provides an output to horizontal ramp generator 36 and delayed one-shot 28. The second is coupled to one-shot 24 which provides an output to vertical ramp generator 38 and delayed one-shot 30, and to flip-flop 26 which provides either an output to analog gates 40 and 42 and output A or to analog gates 44 and 46 and output B. When initiated by one-shot 22, horizontal ramp generator 36 provides a positive ramp output to analog gate 40 and analog gate 46. And, when enabled by one-shot 24 vertical generator 38 provides a positive ramp output to analog gate 42 and analog gate 44.

Gates 40 – 46 pass their inputs when they receive a digital "zero" from flip-flop 26 and short their inputs to ground when they receive a digital one. That is, when flip-flop 26 provides a digital one to analog gate 40 and analog gate 42, they short their respective inputs from generators 36 and 38 to ground. Analog gates 44 and 46, controlled by the signal to output B which is then zero pass their respective inputs from generators 38 and 36. As a result, analog gate 44 provides the control signal coupled to the vertical deflection plates of the vidicon; and, analog gate 46 provides the control signal to the horizontal deflection plates of the vidicon.

Delayed one-shots 28 and 30 which are coupled to the horizontal and vertical deflection plate control signal circuits, respectively, are coupled to OR gate 32 which provides the sync to video amplifier 48. OR gate 34, coupled to both the horizontal and vertical control circuits, provides the blanking control output to vidicon 10 and outputs A and B describe the mode, i.e., whether the system is in the vertical scan or horizontal scan mode of operation.

Figure 3:
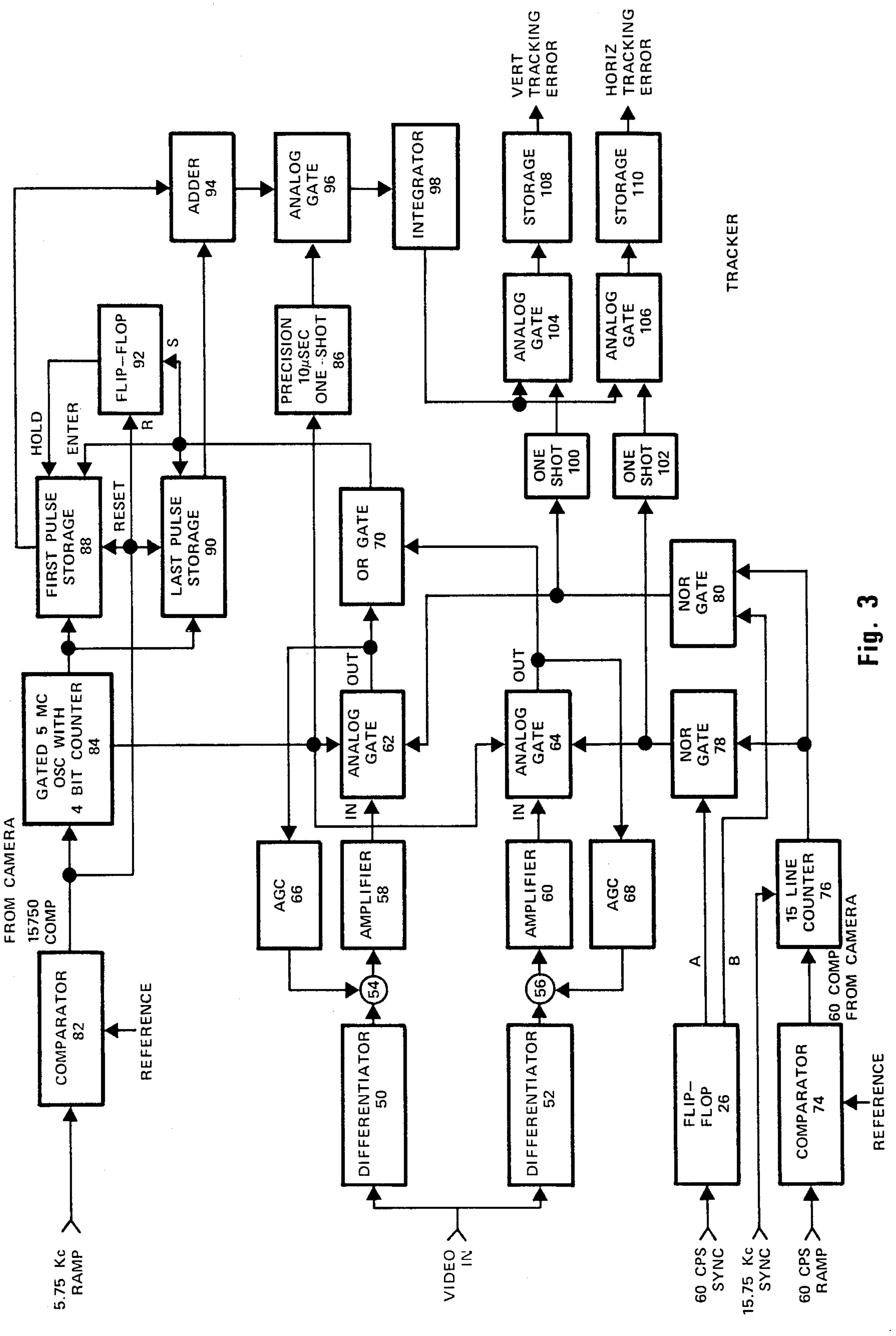
FIG. 3 is a block diagram of the tracker of the television tracking system.

FIG. 3 shows the preferred embodiment of the tracker of the present invention which provides the vertical and horizontal tracking errors. The video output of camera 12 is coupled to differentiators 50 and 52. The output of differentiator 50 is combined at summation point 54 with the automatic gain control feedback signal, provided by automatic gain control 66, and the result applied to the input of amplifier 58. Amplifier 58 provides the amplified signal to analog gate 62. Analog gate 62 is controlled by NOR gate 80 and counter 84.

OR gate 80 is controlled by output B of flip-flop 26 nd the output of 15 line counter 76 which is coupled › control signals provided by the camera. 15 line ounter 76 counts each scan line bounded by the cross-airs. It is initiated by the left, or upper, cross-hair and ounts the succeeding 15 scan lines, during which time IOR gate 80 remains enabled. When counter 76 has ounted 15 scan lines, a one is applied to the input of IOR gate 80, thereby disabling it.

When NOR gate 80 and counter 84 provides syn-hronized outputs analog gate 62 passes the amplified utput of amplifier 58 to OR gate 70.

Likewise, differentiator 52 is combined at summation oint 56 with the feedback signal from AGC 68 and ap-lied to the input of amplifier 60. The amplified output coupled through analog gate 64 to OR gate 70 when oth NOR gate 78 and counter 84 provide outputs. IOR gate 78 is controlled by the output of counter 76 nd output A of flip-flop 26, and provides an output hen both inputs are zero, i.e., during the cross-hair ated period in the vertical scan mode.

The output of OR gate 70 is target pulses and is cou-led to first pulse storage 88, last pulse storage 90, and lip-flop 92. The first target pulse occurring within the ross-hair gated period is received by both first pulse torage 88 and last pulse storage 90. First pulse storage 8 retains the descriptive value of the first pulse's posi-ion within the cross-hair gated period; but, last pulse torage 90 is updated by each additional target pulse ntil the last target pulse occurring within the gated pe-iod is received, the descriptive position value of which vill be retained until the storages are reset.

Flip-flop 92 is reset when the scan intersects with the eft, or upper, cross-hair. The intersection also causes n output which is fed to oscillator and counter 84, which output initiates counting. Once initiated, counter 4 counts the 5 megahertz periods provided by oscilla-or and counter 84 to synchronize the target pulses with he 5 megahertz oscillator.

The position descriptive value of the first detected arget pulse and the position descriptive value of the ast pulse occurring in each line of the gate window are rovided to adder 94 at the completion of each line can. Adder 94 appropriately adds the first target pulse nformation to the last target pulse information and, hen, weights and converts the digital output into ana-og voltage representative of the error caused by the isplacement of the average position value from the enter of the gate. The output of adder 94 is coupled hrough analog gate 96, which is controlled by one-shot 6, to integrator 98. Integrator 98 operates to average he target tracking errors it has received during the 15 can lines. The output of integrator 98 is coupled to an-log gates 104 and 106 which are controlled by one-hots 100 and 102, respectively. One-shots 100 and 02 are controlled, in turn, by NOR gates 80 and 78, espectively. Only one of analog gates 104 and/or 106 re gated at any one time. The one gated at any mo-ent depends on the system's tracking mode at that oment. The outputs of analog gates 104 and 106 are oupled to storages 108 and 110, respectively, which rovide the tracker vertical tracking and horizontal racking errors output.

Figure 4A:
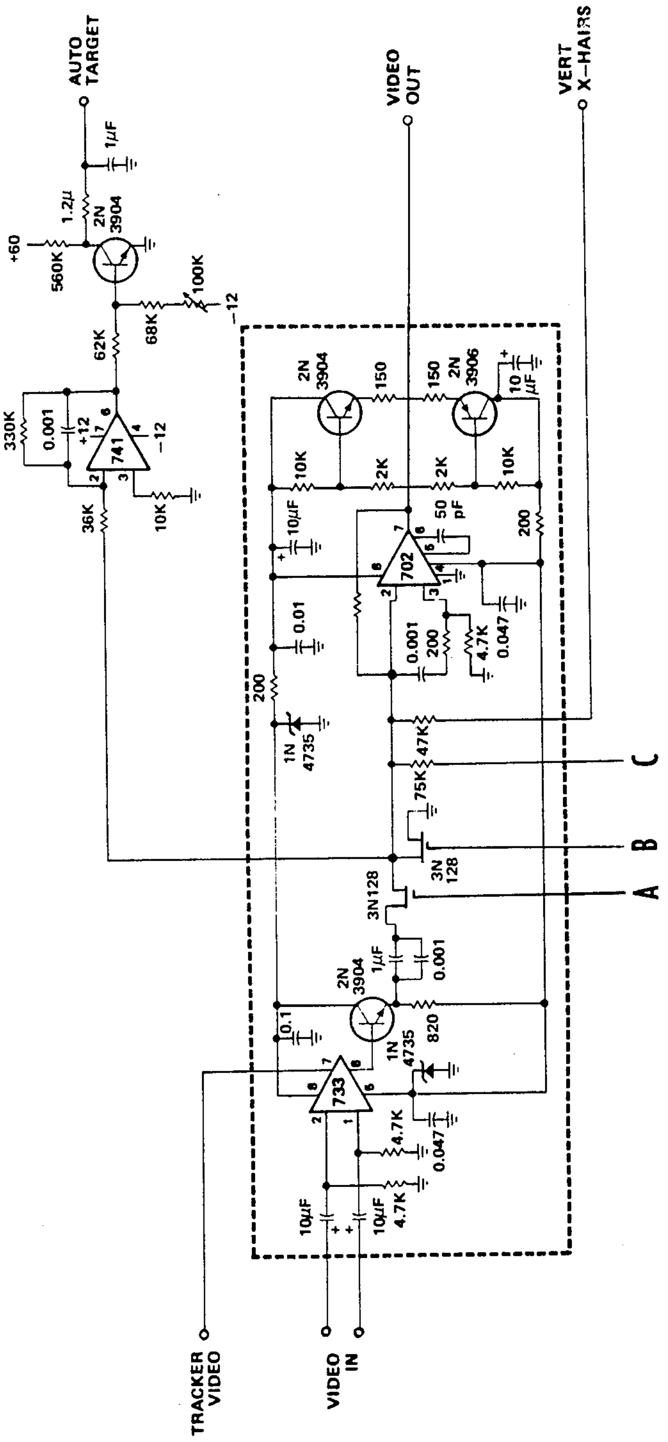
FIG. 4 is a schematic diagram of the camera of the present invention.
Figure 4B:
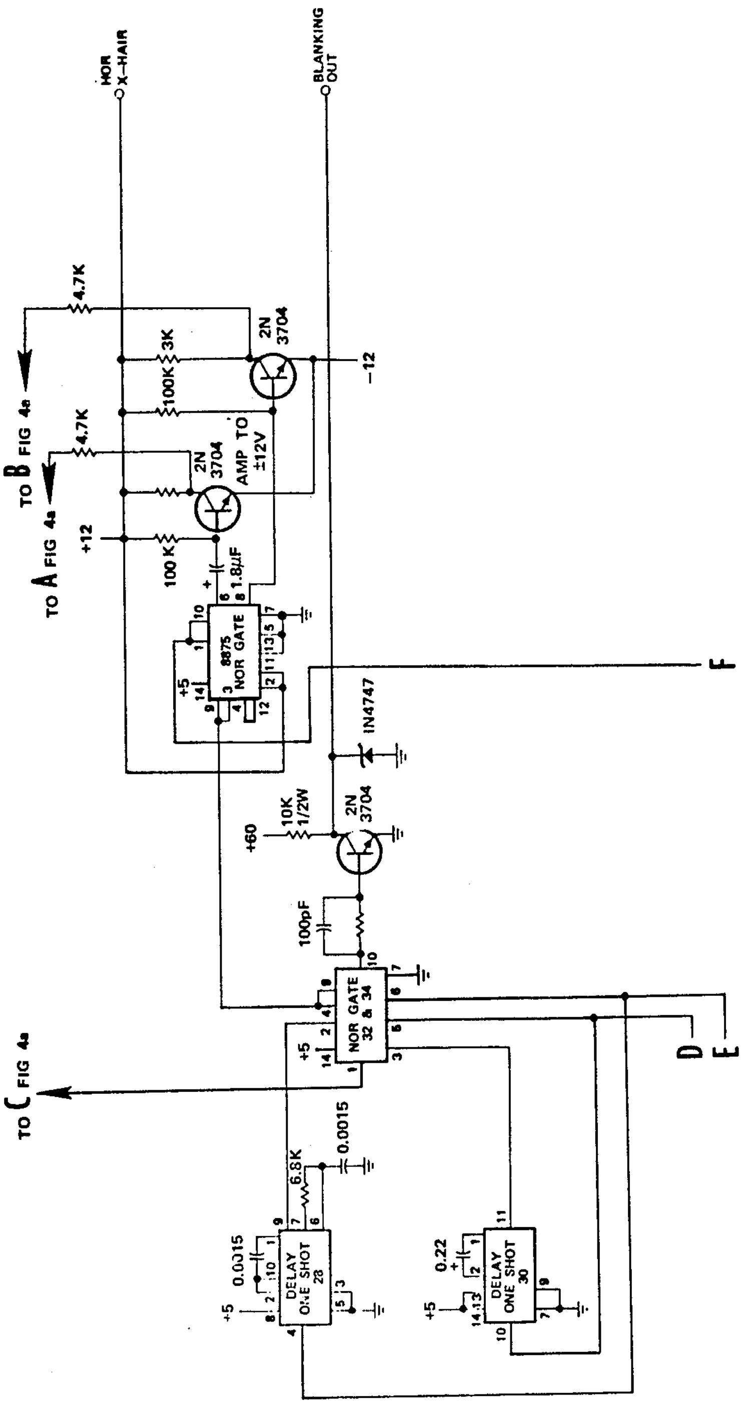
Figure 4C:
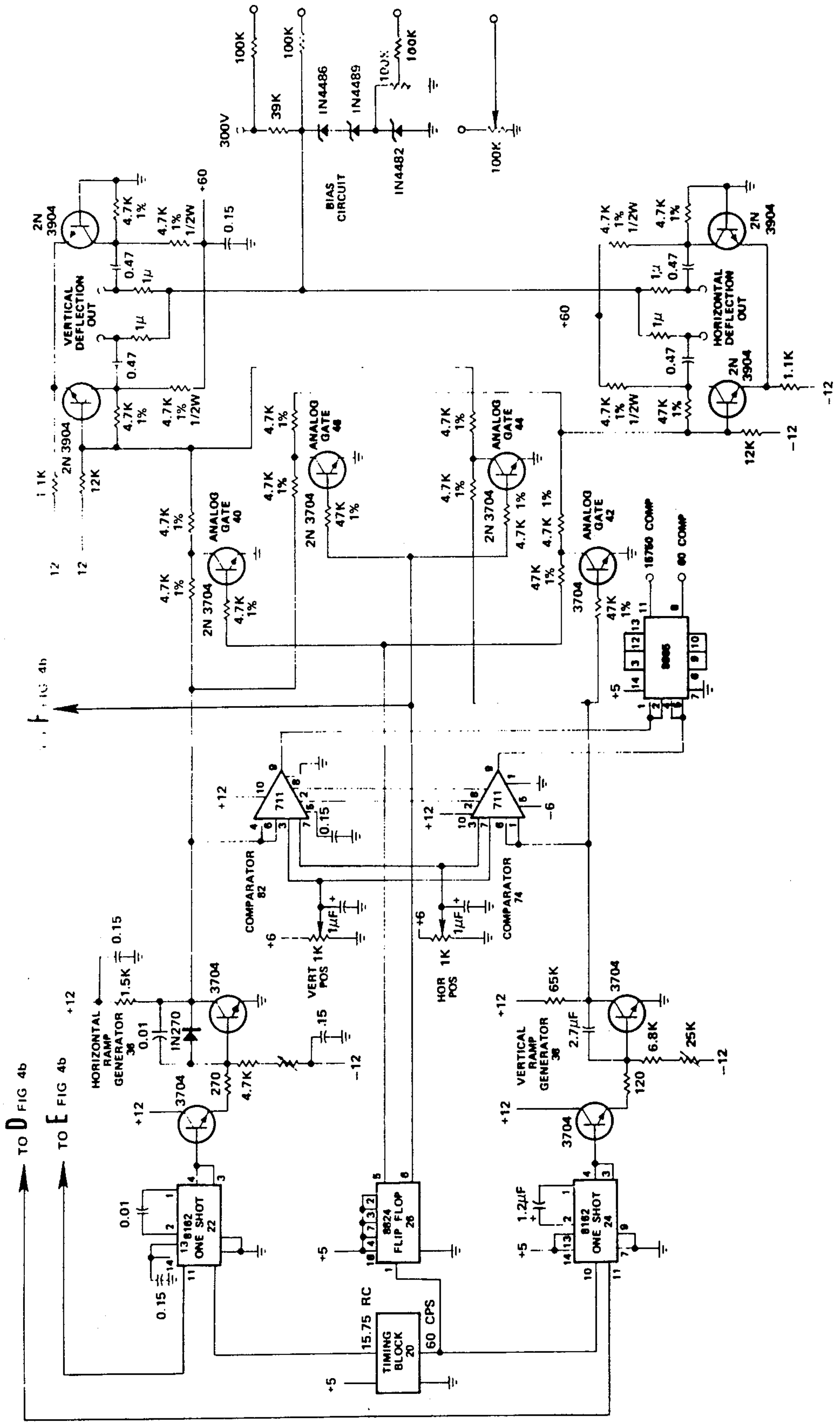

FIGS. 4*a-c* are an example of an operative embodi-nent of the camera of the present invention. The video nput from the vidicon is coupled to video amplifier 48 which is gated by the key clamping signal and provides the tracker and monitor video outputs. The key clamp-ing signal, and the vidicon blanking signal, are both generated by OR gate 34. The blanking signal is ampli-fied so that it will be the proper voltage level to control the vidicon, and the key clamping signal is fed to a NOR gate whereat summing occurs with the horizontal cross-hair signal. Also coupled to the summing NOR gate is output B of flip-flop 26, which output defines the mode in which the system is scanning. The output of the summing NOR gate is amplified and coupled to video amplifier 48.

Synchronizing information is coupled to video ampli-fier 48 by OR gate 32 and one-shots 22 and 28, and 24 and 30. Timing block 20 provides a 15.75 kilohertz sig-nal to one-shot 22 and a 60 hertz signal to one-shot 24 and flip-flop 26.

The camera output to the horizontal deflection plates is provided by either one-shot 22 and horizontal ramp generator 36 coupled through analog gate 46 or one-shot 24 and vertical ramp generator 38 coupled through analog gate 42. The camera output to the verti-cal deflection plates is provided by either one-shot 24 and vertical ramp generator 38 couped through analog gate 44 or by one-shot 22 and horizontal ramp genera-tor 36 coupled through analog gate 40. When the sys-tem is in the horizontal scan mode the A output of flip-flop 26 will be one, which output turns the transistor of gate 40 and 42 on which provides a short to ground. Since output signal A is one output B will be zero and the transistors of gate 46 and 44 will be off. As a result, the output of horizontal ramp generator 36 is coupled to the horizontal deflection plate output and the verti-cal ramp generator 38 is coupled to the vertical deflec-tion plate output. FIG. 4 includes differential amplifiers for boosting and stabilizing the ramp generator outputs before they are applied to the vidicon deflection plates. Comparators 82 and 74 are coupled to the horizontal ramp generator 36 and vertical ramp generator 38, re-spectively. Vertical and horizontal cross-hair position-ing controls are also coupled to comparator 82 and comparator 74. The respective outputs are coupled through a shaping gate to the tracker as signal 15750 COMP and signal 60 COMP, respectively, Additionally shown on FIG. 4 are an automatic target circuit which operates to maintain the video output level at a con-stant by changing the gain of the vidicon, and a bias voltage circuit for providing the circuit and vidicox bias voltages.

Figure 5A:
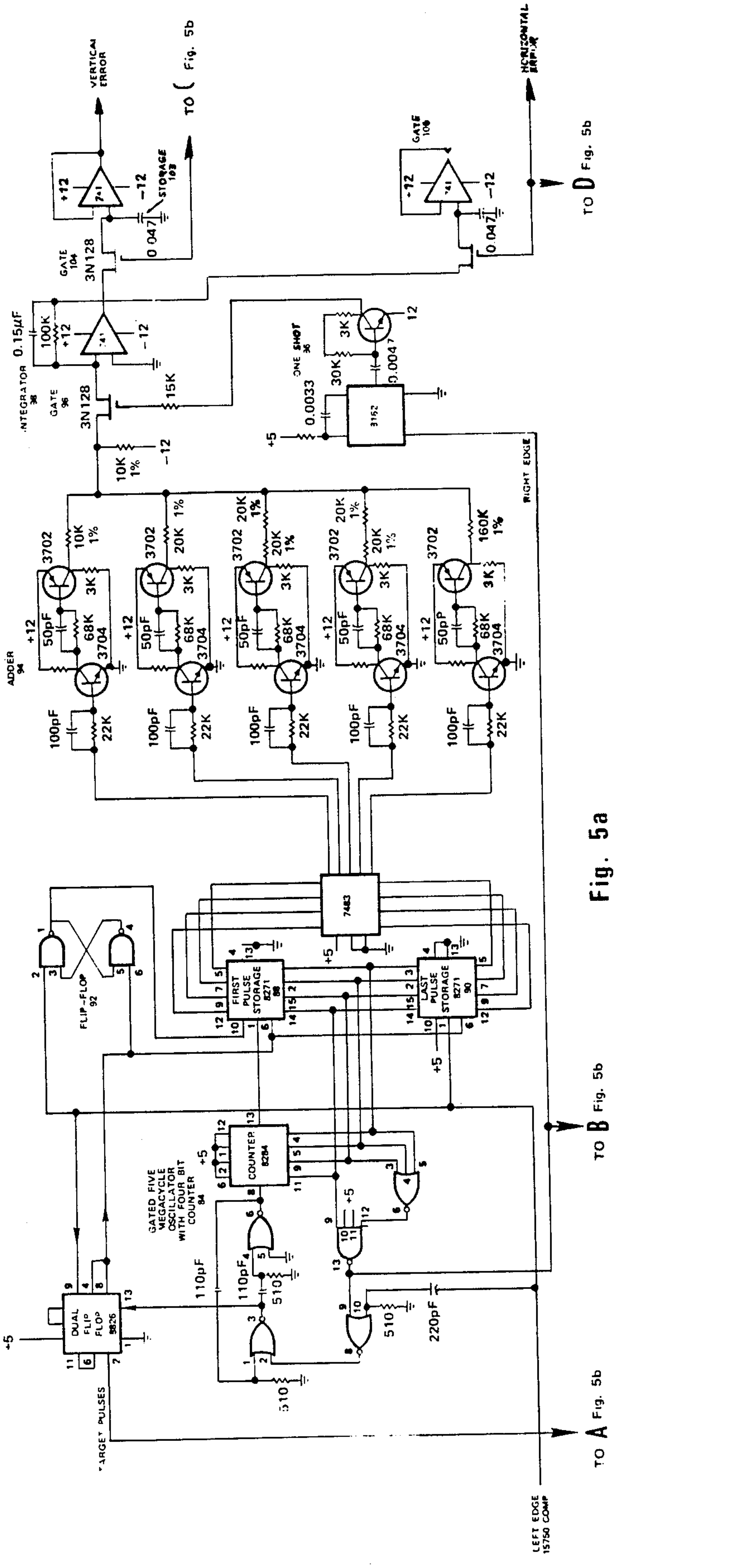
FIG. 5 is a schematic diagram of the tracker of the present invention.
Figure 5B:
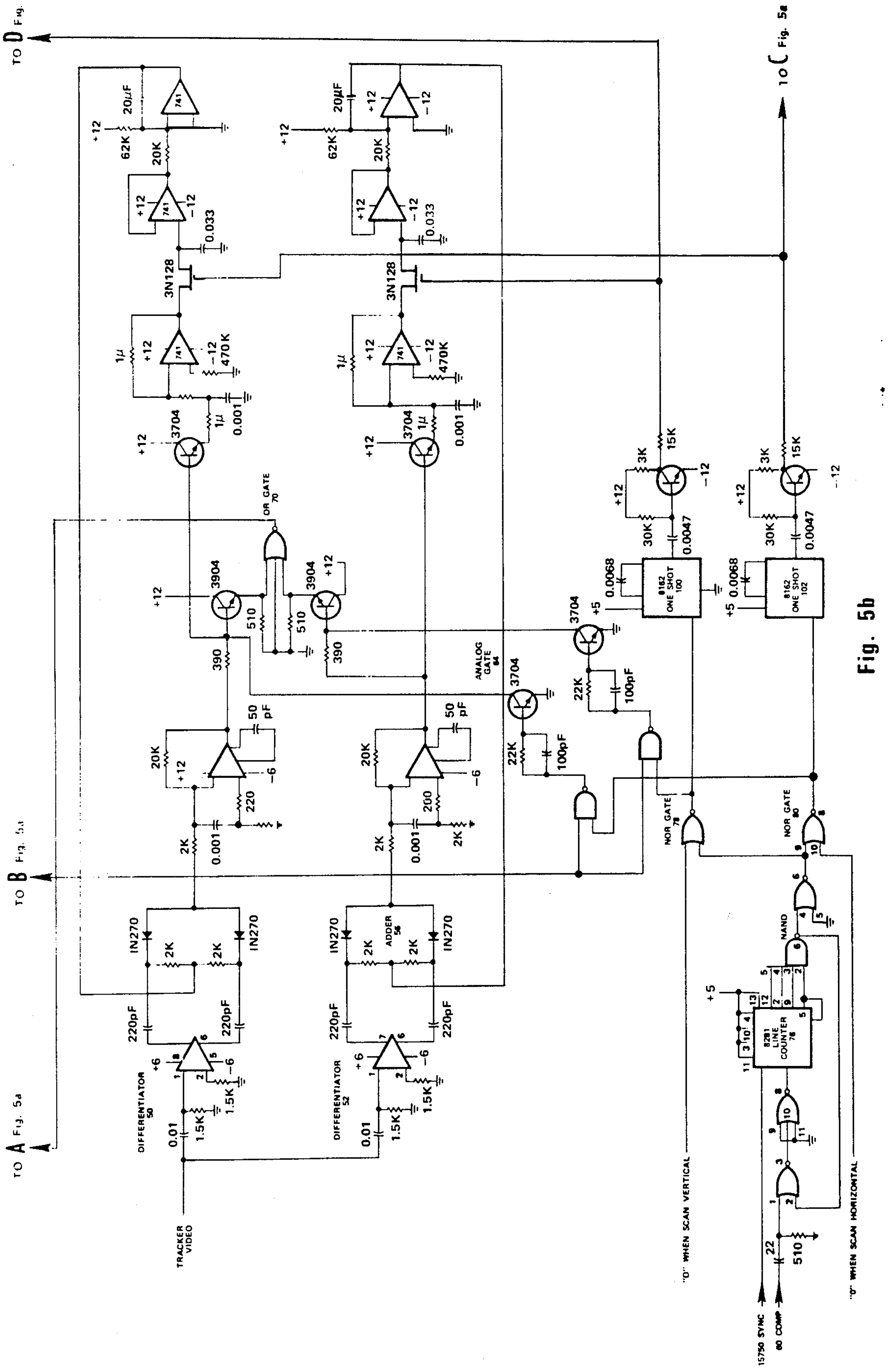

FIGS. 5*a-b* show an example of an operative embodi-ment of the tracker of the present invention. The video output from the camera is fed to differentiators 50 and 52. The output of differentiator 50 is added to the feed-back signal of automatic gain control 66 at summing point 54, the output of which is amplified by amplifier 58 and coupled to analog gate 62. Analog gate 62 oper-ates to short the amplified output to ground when its transistor is "on," when the transistor is "off" the out-put of amplifier 58 is coupled through an emitter fol-lower driver circuit to boost the current level and fed to OR gate 70. Likewise the output of differentiator 52 and the feedback signal of AGC 68 are combined at summing point 56, amplified by amplifier 60, and gated by analog gate 64. If the transistor of gate 64 is "off" the emitter follower driven output of amplifier 60 is coupled to OR gate 70. The signals supplied to analog gates 62 and 64 control which of the two amplified sig-nals will be fed to OR gate 70.

Analog gates 62 and 64 are controlled by an output of line counter 76, and A or B of flip-flop 26 through NOR gates 80 and 78 and oscillator-counter 84. The output of oscillator-counter 84 is zero until the left, or upper, edge of the gate window is intersected by the scan. An output of zero causes the transistor of both gates 62 and 64 to be "on". When the left edge is intersected the oscillator-counter output switches to one, and the outputs of gates 78 and 80 become controlling. If the output of gate 78 is one the output of gate 80 will be zero and the transistor of gate 64 will be "off" coupling the output of amplifier 60 to OR gate 70. Likewise, if the output of gate 80 is one the output of gate 78 will be zero and amplifier 58 will be coupled to OR gate 70. Oscillator-counter 84 provides a one output to gates 62 and 64 during the period of the window in the direction of scan.

Gate 78 will provide a zero output when the system is operating in a horizontal scan mode and the counter 76 is counting. Gate 80, likewise, provides a zero output when the scan is vertical and the counter is counting. Counter 76 is coupled to the 15750 SYNC and 60 COMP outputs of the camera of FIG. 4. The 15750 SYNC output provides a synchronizing signal and the 60 COMP output initiates counting in response to the scan intersection with the gate window.

The output of OR gate 70 is coupled to a dual flip-flop which synchronizes the target pulses with the 5 megacycle clock of oscillator counter 84 so that the target will appear in a discrete interval of the clock and not during a clock transition. The output of the dual flip-flop is coupled to flip-flop 92, and first and last pulse storages 88 and 90. Flip-flop 92 operates to inhibit any additional target pulses from entering first pulse storage 88 after the first target pulse appearing in the window is stored. Last pulse storage 90 is not inhibited and continually updates its stored target pulse information until the window closes.

The "set" position of the counter of oscillator-counter 84 is digitallized value 8. When the left, or upper, edge of the window is intersected by the scan the oscillator becomes enabled, initiating the counter. The counter continues to count at the 5 megacycle rate until it is once again at the digitallized value 8, whereat it stops and waits for the next such intersection. When the counter stops, the scan will be at the edge of the window and the first and last pulses will now be stored.

The value of the first and last pulses, indicating their respective position within the window, are coupled to adder 94. Adder 94 converts the combined values into a current which is proportional to the target deviation from the window's center. For example if the target is left or right, of center a current proportional to the tracking error is provided.

The error defining current is coupled through analog gate 96 to integrator 98. Gate 96 is controlled by one-shot 86 which is in turn triggered by the right, or lower, edge of the window. As a result, the current is coupled to integrator 98 after each line scan during the window has been completed. The action of the integrator 98 and Gate 96 is to algebraically sum the errors produced by the addition of the first and last pulse for each line occuring during the window period. The output of integrator 98 is amplified and provides the vertical, or horizontal, tracking error signal depending on the scan mode. That is, if the scan mode is vertical, gate 104 becomes momentarily conductive and the output updates the vertical tracking error signal; and, if the scan mode is horizontal, gate 106 becomes momentarily conductive and the output updates the horizontal tracking error signal. The error voltages are stored in storage 108 and 110 until the next appropriate scan. The error signals are coupled to platform 18 which mechanically repositions vidicon 10 in response thereto.

Figure 6:
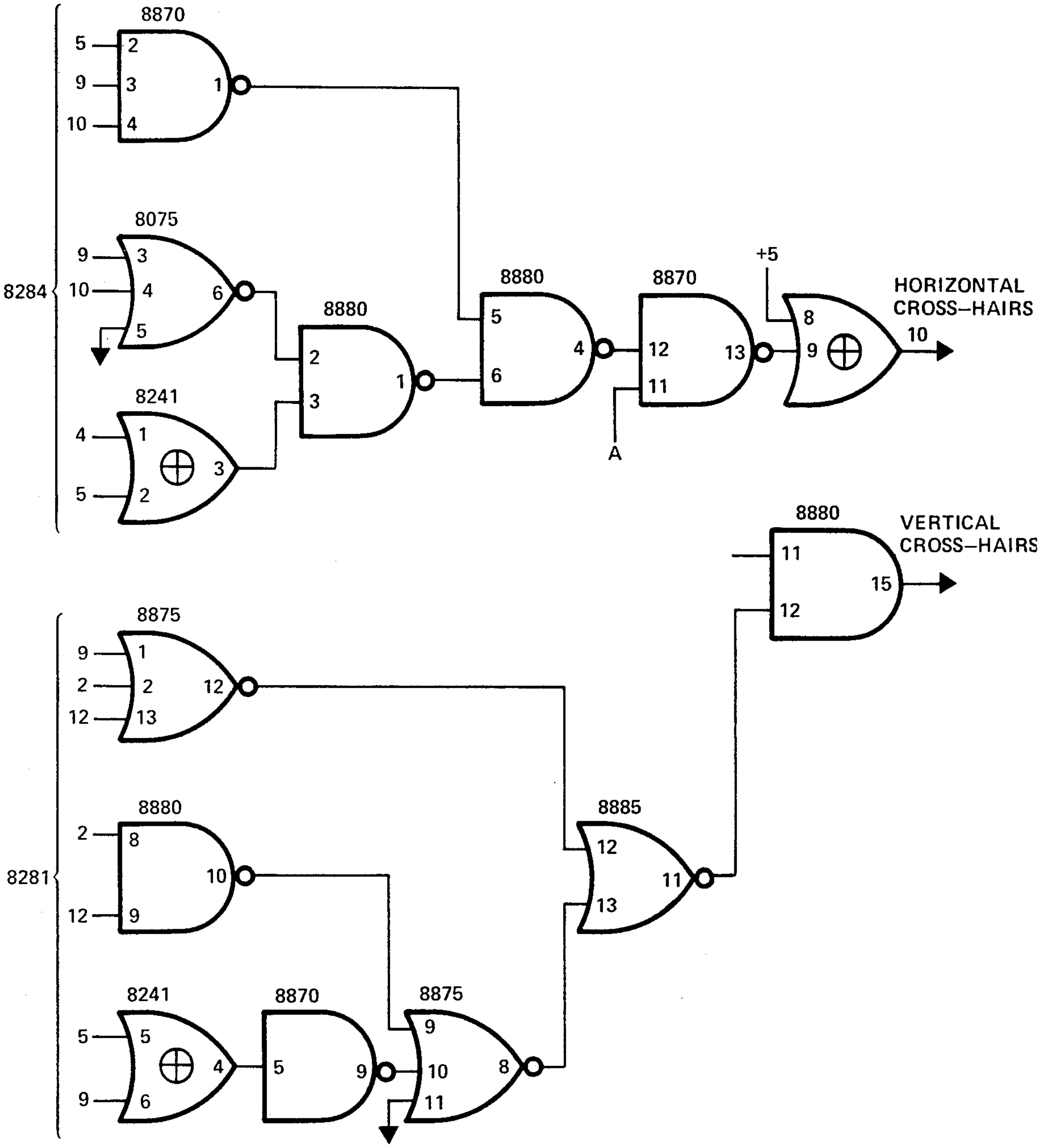
FIG. 6 is a schematic diagram of the cross-hairs generator of the tracker of FIG. 5.

FIG. 6 shows the horizontal and vertical cross-hairs generators of the example of the tracker shown in FIG. 5.

To reiterate, the present invention alternately scans horizontally and vertically, and produces target tracking error signals from direction-of-scan information only. That is, the horizontal tracking error signal is produced when the system is operating in the horizontal scan mode and the vertical error signal is produced when the system is operating in the vertical scan mode.

By using alternate modes of scan many components can be shared to avoid duplication. That is, most of the components used by the horizontal scan mode circuitry when in the horizontal scan mode can be used by the vertical scan mode circuitry when in the vertical scan mode since the modes will not be operated simultaneously.

We claim:

1. A television tracking system comprising:

a television camera tube providing a video output;

a platform on which said camera tube is mounted; and processing means for processing said video output and providing an output that is coupled to, for controlling, said platform and an output that is the system output, comprising means coupled to said video output for amplifying said video output and controlling the scan and scan mode of said tube, including a timing clock for establishing the timing rate of said amplifying and controlling means, horizontal and vertical ramp generators coupled to at least one output of said timing clock, and first switching means coupled to the outputs of said ramp generators for selectively applying the output of said horizontal ramp generator to the horizontal deflection plates, and, the output of said vertical ramp generator to the vertical deflection plates, of said tube, and the output of said horizontal ramp generator to the vertical deflection plates, and the output of said vertical ramp generator to the horizontal deflection plates, of said tube, and means coupled to said amplifying and controlling means for generating signals descriptive of the error with which the system is tracking a target of interest and providing said error signals to said platform;

wherein said television camera tube has a first scan and a second scan and said second scan is at right angles to said first scan; and wherein said processing means includes components which are used to process both the video output associated with said first scan and the video output associated with the second scan.

2. A television tracking system comprising:

a television camera tube providing a video output;

a platform on which said camera tube is mounted; and processing means for processing said video output and providing an output that is coupled to, for controlling, said platform and an output that is the system output, comprising means coupled to said video output for amplifying said video output and controlling the scan and scan mode of said tube; and means coupled to said amplifying and controlling means for generating signals descriptive of the error with which the system is tracking a target of interest and providing said error signals to said platform, including first and second differentiators coupled to the amplified output of said amplifying and controlling means, second switching means coupled to the outputs of said differentiators for selectively coupling the output of one of said differentiators to a means for measuring the first and last target pulses appearing in the tracking window, wherein the selection is dependent on the scan mode of said system, said measuring means coupled to said output of one of said differentiators for providing an output descriptive of the target's offset about the centerline of said window perpendicular to the direction of scan for each line scanned by said tube, averaging means for averaging the descriptive outputs of all of the lines in the window, and third switching means for coupling the averaged, descriptive outputs to said platform as an error signal indicating the tracking error, in the direction of the scan;

wherein said television camera tube has a first scan and a second scan and said second scan is at right angles angles to said first scan; and wherein said processing means includes components which are used to process both the video output associated with said first scan and the video output associated with the second scan.

* * * * *